Jan. 27, 1948.  F. E. MONKS  2,435,150
AERIAL DELIVERY MECHANISM
Filed Sept. 13, 1943  2 Sheets-Sheet 2
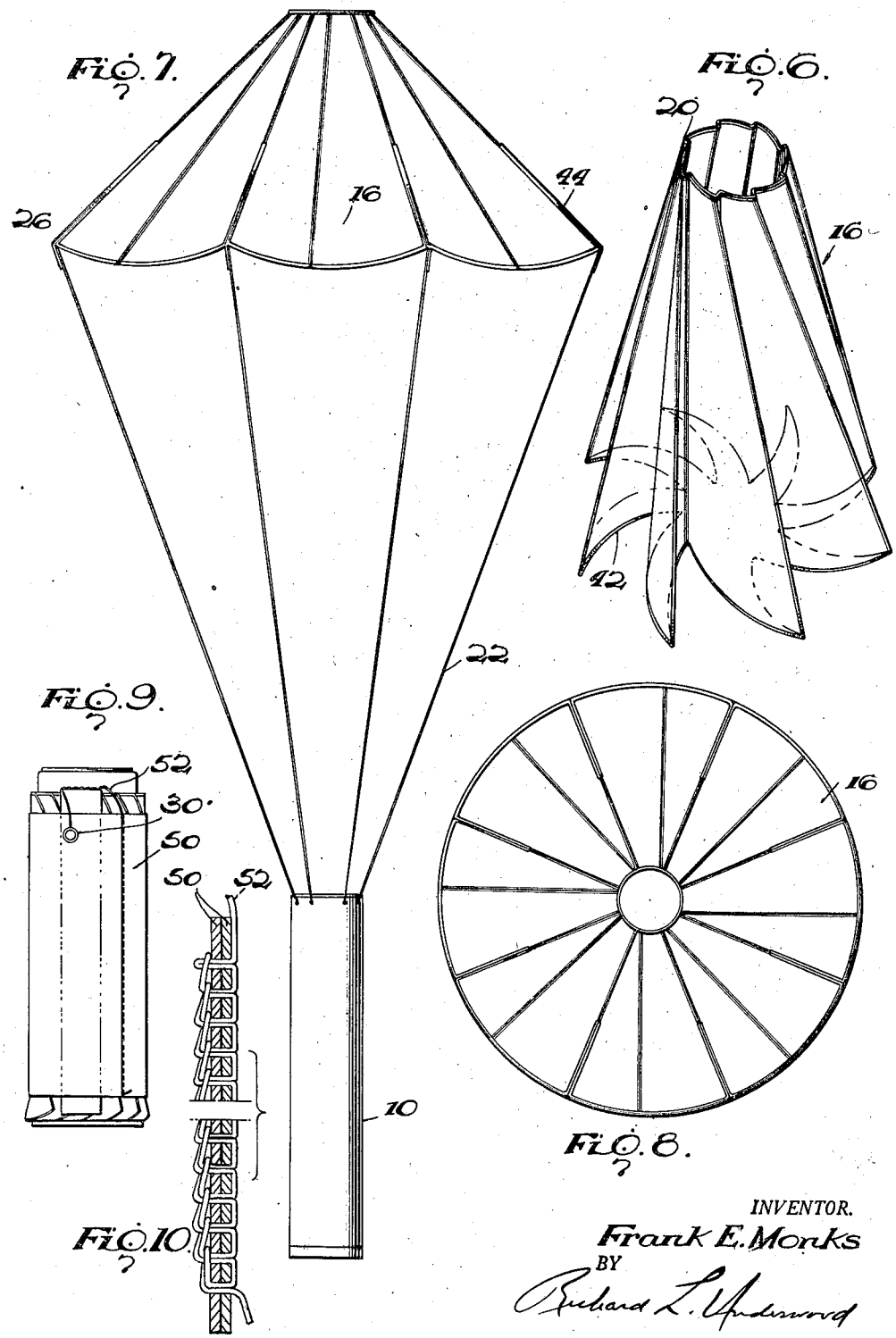
INVENTOR.
Frank E. Monks
BY Patented Jan. 27, 1948

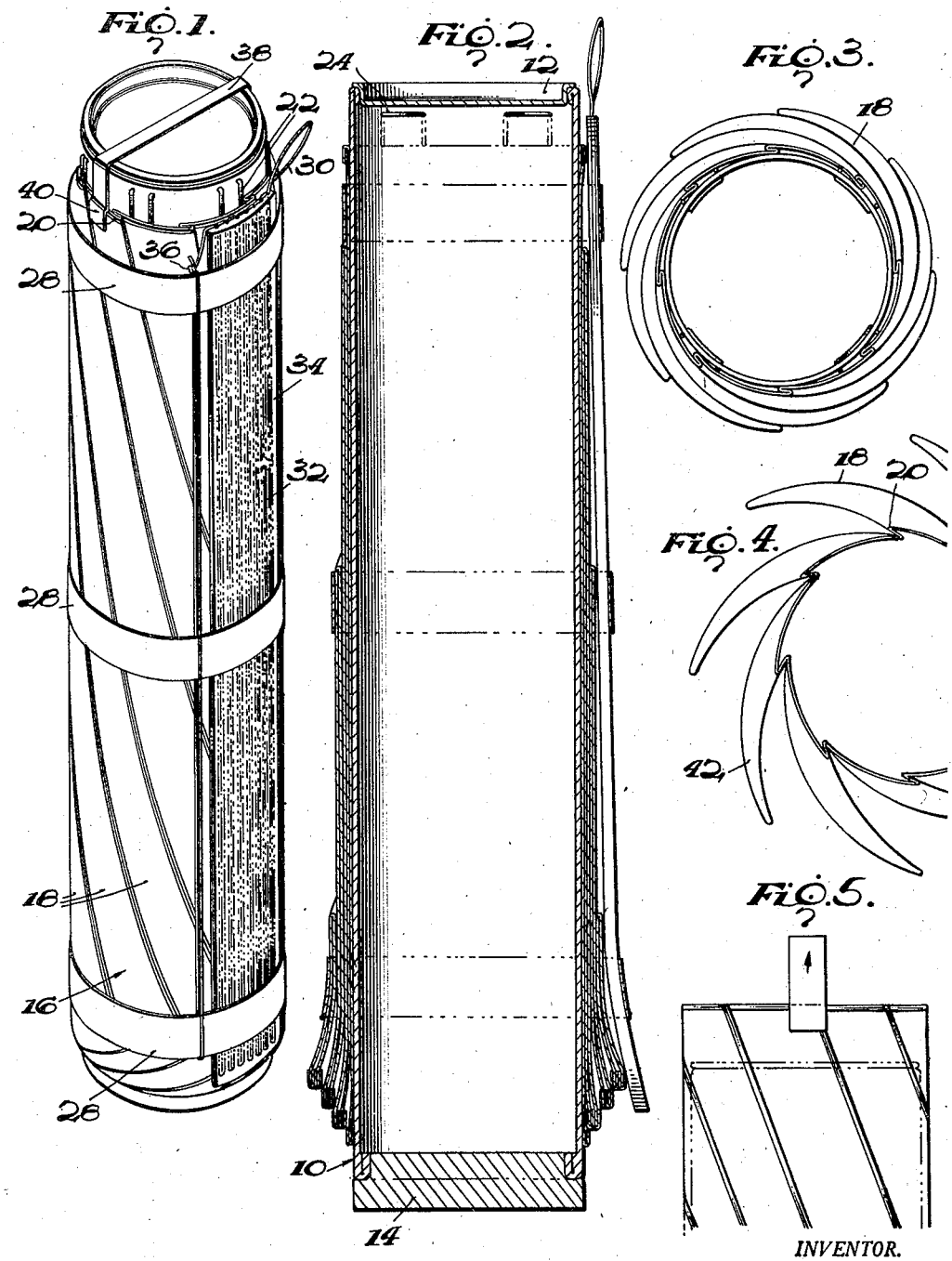

2,435,150

UNITED STATES PATENT OFFICE 2,435,150

AERIAL DELIVERY MECHANISM

Frank E. Monks, Pittsburgh, Pa., assignor to Fuller Label & Box Company, Pittsburgh, Pa., a corporation of Pennsylvania Application September 13, 1943, Serial No. 502,165

10 Claims. (Cl. 244—138)

This invention relates to mechanism for aerial delivery and has particular reference to an integral parachute-receptacle combination of easily manipulable size adapted to be quickly and simply launched by an aircraft pilot and capable of safely delivering substantially any type of goods from relatively low altitudes.

An important object of the invention is to so arrange with the receptacle a parachute sufficiently large to properly deliver a reasonable load that the bulk of the pack as a whole is easily manipulable by an aircraft pilot, and that the parachute will open substantially instantaneously at the desired moment.

A further object is to associate as an integral portion of such a combination a static line or rip cord which is readily manipulable by the pilot from within the aircraft after the device has been launched and which is so arranged in conjunction with the receptacle and the chute that instantaneous opening of the latter at the proper time and in proper relation to the receptacle is assured.

Important features in accomplishing the above specified objects reside in the particular form of the chute, the manner in which it is folded, and the fact that it is folded about the receptacle itself as a mandrel or core. Of importance also in accomplishing the broad objectives of the invention are the manner in which the static line or rip cord is secured to the combination pack so that fouling thereof before or during launching is substantially impossble and the manner in which the receptacle, parachute and static line are arranged with reference to one another to insure the desired sequence of actions in proper timed relation to one another after the device has been launched from within the aircraft.

Still another important feature of the invention is the arrangement whereby blossoming of the parachute above the integrally associated receptacle is insured, thus precluding all possibility of fouling the shroud lines and assuring minimum disturbance of the receptacle contents during the blossoming period together with steady support during descent.

Various other objects and meritorious features of the invention will become apparent from the following description taken in conjunction with the drawings, wherein like numerals refer to like parts throughout the several figures, and wherein:

Figure 1 is a perspective of the packed mechanism;

Fig. 2 is a vertical section through Fig. 1;

Fig. 3 is a top plan view;

Fig. 4 is a view similar to Fig. 3 illustrating the chute as it begins to open;

Fig. 5 is a fragmentary elevation illustrating the relative position of chute and receptacle as the two begin to separate;

Figure 6 is a perspective of the chute per se during an early stage of its blossoming action;

Figure 7 is an elevation of the mechanism after the chute has blossomed fully;

Fig. 8 is a top plan view of the chute;

Fig. 9 illustrates a different form of releasable wrapping, and

Fig. 10 illustrates in detail the release means.

While the shape of the receptacle contemplated by me is not of great importance, I have shown for purposes of illustration a cylindrical or tubular receptacle broadly indicated by the numeral 10. The manner of constructing the receptacle is of no importance, nor is the material of which it is constructed. It is of importance only that the receptacle be not too heavy for its intended purpose, sufficiently rigid and strong to withstand normal shock, and provided with a removable cover such as has been illustrated by the numeral 12 in the drawings, wherein the cover is press-fitted within the open end of the receptacle. In the embodiment illustrated a bottom closure 14 is permanently associated with the receptacle.

A centrally apertured plaited parachute is folded or furled snugly about the container in such manner that when the plaits begin to unfold their engagement with the receptacle is immediately freed and all friction between the two as the receptacle drops from within the folds is eliminated.

The parachute has been broadly indicated by the numeral 16 and its particular construction and manner of plaiting and folding are of distinct importance in obtaining substantially instantaneous separation of the chute and the receptacle after the folds of the former are released and substantially instantaneous blossoming of the chute immediately thereafter.

The parachute when in static condition, folded about the receptacle as a core with the upper end of the receptacle extending through or aligned with the central aperture of the chute, may perhaps best be described as constituting a series of umbrella plaits 18, said plaits being truncated or cut off somewhat short of the point where each pair of adjacent converging fold lines would normally meet to thus provide at 20 a fold capable of lying snugly against the wall of the receptacle but adapted immediately on release of pressure retaining the same in that position to expand radially outwardly. Such expansion immediately on release of restraining pressure permits the receptacle to drop freely through the folded chute even during the period of unfolding and materially facilitates instantaneous freeing of the receptacle from the chute immediately on release of such restraining pressure.

Shroud lines 22 are secured in any desired manner at spaced points around the top of the receptacle and fastened at their free extremities to spaced points of the parachute periphery. In the drawings four separate cords are passed through apertures in the top of the receptacle as indicated at 24 and the free ends thereof secured as indicated at 26 to the parachute periphery at spaced points thereabout. The shroud lines are held in position against the wall of the receptacle by the overlying plaits of the folded chute.

Plaits 18 are held in folded or furled position against the receptacle wall by means of some readily frangible means which may be easily ruptured to release the restraining pressure and permit separation of receptacle and chute after launching. For this I have disclosed for illustrative purposes three spaced rings 28 made of readily frangible material such as paper. Ordinary paper tape may be used, the ends being adhered to one another.

Likewise secured in position by means of frangible retaining means 28, and for that reason constituting what may be regarded as an integral portion of the combination pack, is a static line or rip cord provided at its free extremity with a loop 30. For purposes of illustration the static line is shown positively positioned in independent loops 32 by means of threading the loops into the separated longitudinal passages of a corrugated board or sheet 34. This may be accomplished by using a needle-like device for thrusting the loops into the longitudinal passages from the same end of the corrugated sheet. That end of the static line opposite loop 30 is secured in any suitable fashion to the readily frangible means used for holding the assembled parts in position. In the embodiment illustrated such end of the static line is passed around all of the retaining rings 28 and secured to itself as indicated at 36, thereby forming a single loop encompassing all three rings.

Retaining rings 28 are preferably used to position the corrugated board or sheet 34 over or against the folded chute. Thus when the frangible means is broken, i. e., the rings 28 ruptured, the loop-positioning corrugated sheet will be released from the assembly at the same time that the plaits are released to permit the folds of the chute to blossom.

For purposes which will be described more fully hereinafter when the operation and advantages of the mechanism are brought out in more detail, means are provided to assure separation of the receptacle from the chute in the proper direction during the launching operation. In the embodiment illustrated a tape 38 is passed over the top of the receptacle, the ends being extended down over the wall thereof and secured in suitable fashion to the chute, as by adhering to the upper margin of a plait of the folded chute as indicated at 40.

The receptacle of the mechanism has of course been loaded prior to launching. This may be done prior to completing the assembly of the combination pack, or it may be done in the air by simply releasing tape 38, removing the core of the receptacle, and subsequently replacing securing tape 38 after the cover has been replaced following loading. The operator simply places his thumb or some other rigid element through loop 30 and drops the device through any handily located opening in the aircraft. The static line immediately unreels from within the passages 32 as the assembly drops. The unreeling operation is particularly rapid when the loops of the static line are positively positioned as in the embodiment disclosed and there is no possibility of fouling. However, it will be apparent that various other arrangements for retaining the static line in place prior to launching may be devised without departing from the scope of the broad invention herein disclosed.

When the static line has unreeled fully the weight of the falling device causes the securing loop at the free end thereof to rupture retaining rings 28. While, as hitherto indicated, this particular form of frangible means is not essential to the invention, it will be noted that certain advantages inhere in it. Aside from the simplicity and cheapness of the construction, the arrangement is such that restraining pressures are released successively from the outer margin of the chute toward its central aperture at the top. The lowermost ring 28 is first ruptured, thereby permitting the lower or outer margins of the chute plaits 18 to unfurl or separate from the receptacle core slightly before the intermediate portions and the upper portions of the plaits, respectively, are released. This further assures instantaneous separation of chute and receptacle and substantially instantaneous blossoming thereafter.

With particular reference to Figs. 3, 4 and 6, it will be seen that, after the frangible means or retainer rings 28 have been ruptured to release the folds of the plaited chute, such folds immediately spring outwardly from the packed formation indicated in Figs. 1-3 to the position illustrated in Figs. 4 and 6. Not only do the plaits spring or unfurl radially outwardly, but during this movement the folds of each plait tend to separate at their base as clearly indicated at 42. Substantially simultaneously the small fold 20 at the truncated top of each plait moves radially outwardly, aided in this movement not only by the unfurling of the lower portions of the plaits but by the air which immediately begins to pass upwardly between the folds of the partially opened plaits, to thereby expand the diameter of the central opening in the chute.

This action releases all friction between the receptacle core and the chute, permitting the air passing up at 42 between the folds to decrease the speed of the chute's descent and permit the receptacle to slide downwardly from within the partially opened folds. During such relative movement of the receptacle and chute the latter blossoms forth as more air passes under the folds through 42, and blossoming action is complete at substantially the time when relative descent of the receptacle has reached the limit permitted by shroud lines 22.

In Fig. 5 I have illustrated the relative positions of chute and receptacle when relative movement between the two begins immediately on rupture of the frangible retainer rings 28. The importance of strip 38 is apparent, since it renders impossible relative movement between these two elements other than in the proper direction, i. e., movement of the receptacle away from the top of the chute.

The material and construction of the parachute, aside from what I have termed the truncated umbrella plait, is of importance only insofar as controlled by practical considerations. The chute may be made from paper, fabric, plastic or any combination thereof. If paper is used it may be either plane-surfaced or creped in one or both directions. Such creping tends to absorb any shock of opening. It may be reinforced by sewing or gluing fabric or plastic tapes along a portion or all of the folds and edges, as indicated at 44 in Fig. 7. The material used may be coated or impregnated for fungicide and water resistance, or treated in any manner that circumstances may render desirable. The shroud lines 22 may be fastened to the margin of the parachute in any suitable manner.

It will be apparent that, within the scope of certain of the broader phases of my invention, relatively light-weight material of inherently resilient characteristics, such as spring wire, might be employed along the outside edge of the parachute and arranged in such manner as to tend to straighten out the folds when restraining pressure is released. Furthermore, such inherently resilient material might be secured to the receptacle itself and arranged in such manner as to force the parachute folds outwardly on release of the frangible restraining means.

As hitherto indicated, the broad phase of the invention does not necessarily contemplate any particular form of frangible means, such as retainer rings 28. A variation which has been successful is the provision of an outside paper wrapper for the entire device, the arrangement being such that the static line after unreeling rips the entire covering from the device. In certain instances it might be desirable to secure the outer wrapper, which may be of paper or other light weight, readily frangible material, to the top of the chute by a string, tape or other suitable means. Under such circumstances the wrapper will serve as a pilot-chute to aid in pulling the main chute off the receptacle, thus further speeding the blossoming operation.

In Figs. 9 and 10 I have illustrated a somewhat different embodiment of the invention wherein the elements of the packed chute receptacle combination are held in position by a wide wrapper 50 in lieu of the tapes 28 used for that purpose in the earlier described embodiment. This type of wrapper may be sufficiently large to cover and protect the major portion of the exposed area of the packaged combination and a rip cord 52 is used to stitch together the overlapped ends of the wrapping material. A stitch, such as the chain stitch illustrated in Fig. 10, capable of releasing the stitches when the rip cord 52 is placed under tension by pulling the loop or ring 30' has been found eminently satisfactory for this purpose. When such a stitch is used the material of the wrapper need not be frangible and in fact there is no limitation on the type of material that may be used for the wrapper under such circumstances.

However, it will be apparent that a readily rupturable or frangible wrapping material may be used, such as the paper suggested for retaining rings 28, and the end of the rip cord 52 could be tied to the far or lower extremity of a different sort of stitching by which the ends of the wrapper are secured together. Under such circumstances tension on the rip cord 52 would loosen the stitching to thereby remove the wrapper and permit blossoming of the chute.

While the particular form of plait has been, it is believed, accurately described by general reference to an umbrella plait, it will be noted from Fig. 8 that each plait is formed by a pair of adjacent fold lines converging from spaced points around the margin of the chute periphery, such folds being in opposite directions. The peripheral distance between these converging fold lines is somewhat less than the peripheral distance between each successive pair of converging fold lines, this difference in peripheral distances representing the extent to which each plait is exposed, or not overlaid, by an adjacent plait when the chute is in folded or furled position. The outer radial margins of each plait in the form illustrated, it will be noted, are parallel. As heretofore explained, the plaits are truncated or sliced off at a point somewhat short of the normal meeting point of the converging plait fold lines, thereby assuring expansion of the central aperture of the parachute when the folded chute begins to open.

While, as hitherto explained, the chute may be made of any suitable material, it is perhaps preferable that there be a certain amount of rigidity or stiffness inherent in the material. Such property or characteristic tends to retain the chute plaits in position during successive stages of opening, and the resiliency in each such plait when folded or furled speeds the opening sequence, particularly at that stage immediately following rupture of the frangible means. Tough paper has been found eminently suitable.

While the mechanism herein described and claimed has been designed to a large extent as a means for safely and efficiently delivering from within an aircraft at low altitudes medical requirements used in the field by our armed forces in action, it will be readily apparent that there is no limitation on the use to which the invention may be put.

By virtue of the rapidity with which the chute blossoms after launching, the device may be dropped at extremely low altitudes. The packaged device is compact and readily manipulable by an individual from within any type of aircraft. No large opening is necessary for launching. The static line or rip cord is so associated with the other elements as to insure against tangling or fouling, as are the shroud cords connecting the receptacle and the chute.

While a specific embodiment of the broad invention has been illustrated herein and described, and various other obvious modifications of the basic concept have been suggested, these are not to be regarded as limitations on the scope of the invention.

What I claim is:

1. Mechanism of the class described comprising a receptacle forming a core, a centrally apertured umbrella-plaited chute folded about said core, the plaits of said chute being truncated below the normal meeting point of adjacent converging fold lines of the plaits, frangible means retaining said chute in folded position about the core, a static line so secured to said assembly as to rupture the frangible means when placed under tension, and shroud lines extending beneath the folds of the chute connecting the upper end of said receptacle with the margin of said chute.

2. Mechanism of the class described comprising a receptacle forming a core, a centrally apertured umbrella-plaited chute folded about said core, the plaits of said chute being truncated and positioned with reference to said receptacle so that the top of the latter extends through the central aperture of the chute, means secured to said chute cooperable with the core precluding relative movement of the chute and receptacle in one direction, frangible means retaining said chute in folded position about the receptacle, and a static line so secured to said assembly as to break the frangible means when placed under tension.

3. In combination with mechanism of the class described, a receptacle forming a core, a centrally apertured plaited chute folded about said core with the ends of the latter projecting beyond the folds at each end thereof, and means secured to the margin of said chute aperture cooperable with the receptacle for precluding relative sliding movement of the chute in one direction with reference to its core.

4. Mechanism of the class described comprising a receptacle forming a core, a plaited chute folded about said core, shroud lines connecting the receptacle with the outer margin of said chute, a static line having one end free for grasping looped along the length of the folded chute, means for positively retaining said static line in looped position, and frangible means for holding said last mentioned means in position upon the chute folds and retaining the chute in folded position.

5. Mechanism of the class described comprising a receptacle forming a core, a plaited chute folded about said core, shroud lines connecting the receptacle with the outer margin of said chute, a static line having one end free for grasping looped along the length of the folded chute, means for positively retaining said static line in looped position, and frangible means for holding said last mentioned means in position upon the chute folds and retaining the chute in folded position, that end of the static line opposite the free end being so positioned with reference to said frangible means as to rupture the latter when placed under tension after unreeling from its looped position.

6. Mechanism of the class described comprising a centrally apertured parachute, a receptacle extending through the aperture, said chute being folded around the receptacle as a core, readily frangible means retaining the chute folds around the receptacle, shroud lines connecting the chute margin with the receptacle, a static line overlying said folds in loops and secured at one end to said frangible means and exposed for manual grasping at the other, and means for positively retaining said static line in looped position free of said folds, said means being positioned by said frangible means.

7. In mechanism of the class described the combination of a receptacle forming a core, a centrally apertured umbrella-plaited chute folded about said core, said plaits being truncated adjacent the normal point of meeting of adjacent converging fold lines, means secured to said chute cooperable with the core precluding relative movement of the chute and core in one direction while permitting free relative sliding movement between the two in the opposite direction, and means for retaining said chute in folded position about the core.

8. In mechanism of the class described a receptacle forming a core and having a removable closure at its top, a plaited chute folded about said core and having a central aperture receiving the top end of the receptacle, means cooperable with the chute and receptacle precluding movement of the latter outwardly through the chute aperture while permitting free relative sliding movement between the two in the opposite direction, and shroud lines connecting the top of the receptacle with the outer margin of the chute.

9. Mechanism of the class described comprising a receptacle forming a core, a chute folded about said core, shroud lines connecting the chute with the receptacle, means for normally retaining the folds of the chute in position about the core, and a static line looped along the folds of the chute and positioned therealong by said retaining means, one end of said static line being connected to the retaining means in such manner as to release the same when placed under tension and the other end being free to grasp.

10. Mechanism of the class described comprising a receptacle forming a core, a centrally apertured umbrella-plaited chute folded about said core, the plaits of said chute being truncated and positioned with reference to said receptacle so that the top of the latter extends through the central aperture of the chute, means secured to said chute cooperable with the core precluding relative movement of the chute and receptacle in one direction, means retaining said chute in folded position about the receptacle, and means carried by said assembly operable a predetermined period after launching the same to release the retaining means.

FRANK E. MONKS.

REFERENCES CITED

The following references are of record in the file of this patent:

UNITED STATES PATENTS

| Number | Name | Date |
|---|---|---|
| 2,306,321 | Roberts | Dec. 22, 1942 |
| 1,793,729 | Askam | Feb. 24, 1931 |
| 1,270,419 | Kendig | June 25, 1918 |
| 2,370,150 | Dirksen | Feb. 27, 1945 |

FOREIGN PATENTS

| Number | Country | Date |
|---|---|---|
| 418,806 | France | Oct. 10, 1910 |
| 726,459 | France | Mar. 7, 1932 |
| 260,217 | Germany | May 20, 1913 |
| 424,376 | Germany | Jan. 22, 1926 |
| 137,429 | Great Britain | Jan. 15, 1920 |